United States Patent
Schaefer et al.

(10) Patent No.: US 9,752,675 B2
(45) Date of Patent: Sep. 5, 2017

(54) TRANSMISSION CONTROL CIRCUIT

(71) Applicant: Deere & Company, Moline, IL (US)

(72) Inventors: Helmut Schaefer, Ketsch (DE); Guenter Rheinheimer, Wachenheim (DE); Steffen Frassek, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 14/860,925

(22) Filed: Sep. 22, 2015

(65) Prior Publication Data
US 2016/0025211 A1 Jan. 28, 2016

Related U.S. Application Data

(63) Continuation of application No. PCT/IB2014/000562, filed on Mar. 20, 2014.

(30) Foreign Application Priority Data

Mar. 26, 2013 (DE) .................. 10 2013 205 358

(51) Int. Cl.
F16H 59/14 (2006.01)
F16H 61/00 (2006.01)
(Continued)

(52) U.S. Cl.
CPC .......... F16H 61/0021 (2013.01); F16H 59/14 (2013.01); F16H 59/46 (2013.01);
(Continued)

(58) Field of Classification Search
CPC ...... F16H 61/0021; F16H 61/12; F16H 59/14; F16H 59/46; F16H 2061/1232;
(Continued)

(56) References Cited

U.S. PATENT DOCUMENTS 6,470,247 B1 10/2002 Meyer et al.
2002/0107108 A1 8/2002 Last

FOREIGN PATENT DOCUMENTS

AT 352735 2/2007
AU 2002300958 8/2007
(Continued)

OTHER PUBLICATIONS

German Search Report in foreign counterpart application No. 10 2013 205 358.4, dated Oct. 17, 2016 (5 pages).

*Primary Examiner* — Roger Pang

(57) ABSTRACT

A transmission control circuit for controlling a system pressure provided by a pressure pump in a transmission. The circuit includes a pressure control valve and an electronic control unit. Load states and operating states of the working machine can be detected by the control unit and transmission input torque limits associated with the load states and state values representing at least one first operating state and state values representing at least one second operating state are stored therein. The first operating state corresponds with the maximum system pressure and the second operating state corresponds with a reduced system pressure compared to the maximum system pressure. The circuit includes a pressure limiting valve activated by the control unit to overrule the pressure control valve in order to variably set the reduced system pressure.

16 Claims, 4 Drawing Sheets

(51) Int. Cl.
*F16H 59/46* (2006.01)
*F16H 61/12* (2010.01)

(52) U.S. Cl.
CPC ......... *F16H 61/12* (2013.01); *B60W 2300/15* (2013.01); *F16H 2059/147* (2013.01); *F16H 2061/1232* (2013.01); *Y10T 477/692* (2015.01); *Y10T 477/6939* (2015.01); *Y10T 477/69395* (2015.01); *Y10T 477/693958* (2015.01); *Y10T 477/693962* (2015.01)

(58) Field of Classification Search
CPC ........... F16H 2059/147; Y10T 477/692; Y10T 477/699; Y10T 477/69395; Y10T 477/693958; Y10T 477/693962
USPC .......................................................... 701/60
See application file for complete search history.

(56) References Cited

FOREIGN PATENT DOCUMENTS

| | | |
|---|---|---|
| DE | 102005028848 | 1/2007 |
| DE | 60217933 | 5/2007 |
| EP | 1436532 | 9/2002 |
| EP | 1541901 | 6/2005 |
| WO | 03031846 | 4/2003 |

TRANSMISSION CONTROL CIRCUIT

RELATED APPLICATIONS

This application is a continuation application of PCT International Application Serial No. PCT/IB2014/000562, which has an international filing date of Mar. 20, 2014 and designates the United States of America, and which claims the benefit of German Application Ser. No. 102013205358.4, filed on Mar. 26, 2013. The disclosures of these aforementioned applications are hereby expressly incorporated by reference in their entirety.

FIELD OF THE DISCLOSURE

The present disclosure relates to a transmission control circuit for the control of a system pressure provided by a pressure pump in a transmission of a working machine, with a pressure control valve for setting the provided system pressure to a maximum system pressure, an electronic control unit and a pressure limiting valve that can be activated by the control unit.

BACKGROUND

Conventional transmission control circuits for the control of a system pressure in a transmission control the system pressure to a predefined constant pressure level. The pressure level is selected to be sufficiently high that the hydraulically operated clutches and brakes within the transmission can transfer torque without slip even under high load. This design achieves a high capability of torque transfer capacity on the one hand, but takes into account that the pressure pump provides the high pressure level continuously, even if this would sometimes not be necessary for the reliable transfer of torque. From the viewpoints of efficiency and consumption, it would be desirable to deliberately relieve the load on the pressure pump if a reduced system pressure would be sufficient for reliable torque transfer. In particular, it would be desirable to variably adapt a reduced system pressure to currently existing operating conditions of the working machine.

SUMMARY

The present disclosure provides a transmission control circuit for variable control of a system pressure in a transmission.

In one embodiment, a transmission control circuit is provided for the control of a system pressure provided by a pressure pump in a transmission of a working machine, with a pressure control valve for setting the provided system pressure to a maximum system pressure $p_0$, an electronic control unit, by means of which load states and operating states of the working machine can be detected and in which the transmission input torque limits $L_{1, 2, \ldots n}$ associated with the load states and at least one state value representing a first operating state and at least one state value representing a second operating state are stored, wherein the first operating state is associated with the maximum system pressure $p_0$ and the second operating state is associated with a system pressure $p_{1, 2, \ldots n}$ that is reduced relative to the maximum system pressure $p_0$, a pressure limiting valve, which can be activated by the control unit to overrule the pressure control valve in order to variably adjust the reduced system pressure $p_{1, 2, \ldots n}$, wherein activation of the pressure limiting valve takes place depending on a comparison of a detected load state with a transmission input torque limit $L_{1, 2, \ldots n}$ with the simultaneous existence of a second operating state.

In this disclosure, a distinction is made between load state and operating state. A load state is defined as a state in which a torque is being transferred by means of the transmission of the working machine. An operating state is defined as a switching state in which although no torque is being transferred by means of the transmission, torque can be transferred, and in which the working machine or parts thereof are in a certain "selected" state such as, for example, a four-wheel drive mode, engaged differential lock, no-load mode. According to this disclosure, it is further provided that regarding operating states a distinction is made between first operating states and second operating states. Following the identification of a first operating state, setting the maximum system pressure is hereby forced regardless of the currently existing load state. If by contrast a second operating state is identified, the maximum system pressure or a reduced system pressure is set depending on the currently existing load state. In principle, it is assumed that a failed activation of the pressure limiting valve results in no overruling of the pressure control valve, so that the maximum system pressure is set. Activation of the pressure limiting valve, on the other hand, results in overruling of the pressure control valve as determined by the system, so that a reduced system pressure is set compared to the maximum system pressure.

In the present disclosure, the transmission control circuit can reduce the necessary drive power for the pressure pump. The drive power for the pressure pump can be a parasitic load. Because the pressure control valve can be overruled, the system pressure can be adapted to a currently existing demand on the system pressure within the transmission in a certain load and operating state. The demand on the system pressure can be described as a torque transfer capability of a power shift clutch. Considering the entire transmission, there is a defined number of load paths, wherein each of said load paths can extend over a plurality of power shift clutches. The torque transfer capacity of each load path is thus determined by the clutch with the lowest torque transfer capacity. Transmission input torque limits result from said load paths with their respective torque transfer capacities, with which for their part in turn discrete system pressures can be associated, wherein the maximum system pressure set by the pressure control valve is associated with the load path with the maximum necessary torque transfer capacity, i.e., the highest transmission input torque limit.

In the present disclosure, any number of different system pressures below the maximum system pressure can be variably set as a result of the proportional overruling of the pressure control valve by the pressure limiting valve. In one embodiment, system pressures are provided at four pressure levels below the maximum system pressure.

The control unit detects a load state using a determined transmission input torque $M_{trans}$, so that electronic activation of the pressure limiting valve is carried out depending on the relationship of the determined transmission input torque $M_{trans}$ to a transmission input torque limit $L_{1, 2, \ldots n}$. The transmission input torque can be directly sensed in a simple manner or indirectly determined from other available values.

The electronic activation of the pressure limiting valve for setting a reduced system pressure $p_{1, 2, \ldots n}$ takes place if the determined transmission input torque $M_{trans}$ lies below a transmission input torque limit $L_{1, 2, \ldots n}$. This results in a simple control criterion for setting a reduced system pressure.

The electronic activation of the pressure limiting valve for increasing a reduced system pressure $p_{1, 2, \ldots n}$ takes place if the measured transmission input torque $M_{trans}$ lies above a transmission input torque limit $L_{1, 2, \ldots n}$. This also results in a simple control criterion for setting a reduced system pressure.

Increasing the reduced system pressure $p_{1, 2, \ldots n}$ in the presence of a suitable control criterion is carried out immediately without a time delay, whereas if there is a suitable control criterion for setting a reduced system pressure $p_{1, 2 \ldots n}$ the corresponding transmission input torque limit is multiplied by a hysteresis factor $h_x<1$. It can also be provided that the torque is below the modified transmission input torque limit at least for a defined period of time, t. The activation results in the prevention of pressure fluctuations.

The transmission input torque $M_{trans}$ is determined based on a drive torque $M_{eng}$ of a drive unit of the working machine. Here, the drive torque $M_{eng}$ of the drive unit is a parameter that is known by the control unit.

Parasitic loads are included for determining the transmission input torque $M_{trans}$ from the drive torque $M_{eng}$. This enables more accurate determination of the transmission input torque $M_{trans}$.

In another embodiment, the pressure limiting valve sets the reduced system pressure by manipulating a spring force of a spring-piston unit of the pressure control valve. Moreover, the basic design of the pressure control valve can be retained on the one hand and on the other hand the same is responsible both for setting the maximum system pressure and also a reduced system pressure.

In another embodiment, a relief point of the provided system pressure in the coolant circuit can be adjusted by manipulating the spring force of the spring piston unit of the pressure control valve. As such, the existing configuration of the hydraulics at this point does not have to be altered, because the existing relief point of the pressure control valve would only be made adjustable by overruling the pressure limiting valve.

A first operating state may be characterized by a differential lock being in an engaged state or by a state of increased slip within the transmission. As a result of said grouping, the control unit is in a position to decide whether the maximum system pressure is necessary or a reduced system pressure is sufficient.

A second operating state may be characterized by an unloaded no-load state or a differential lock or a power take-off in the working machine being in a disengaged state. As a result of said grouping the control unit is in a position to decide whether the maximum system pressure is necessary or a reduced system pressure is sufficient.

An existing activation of the pressure limiting valve remains unaltered by the control unit during a transmission shift process. Here a shift process is defined as shifting from one gear to another gear. Unwanted influence on the modulation during the shift process or the clutch process can be prevented here.

In the event of concurrent activation signals by the control unit for the pressure limiting valve, the signal corresponding to a higher system pressure is prioritized.

In another embodiment, a method is provided for the control of a transmission control circuit as described herein.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
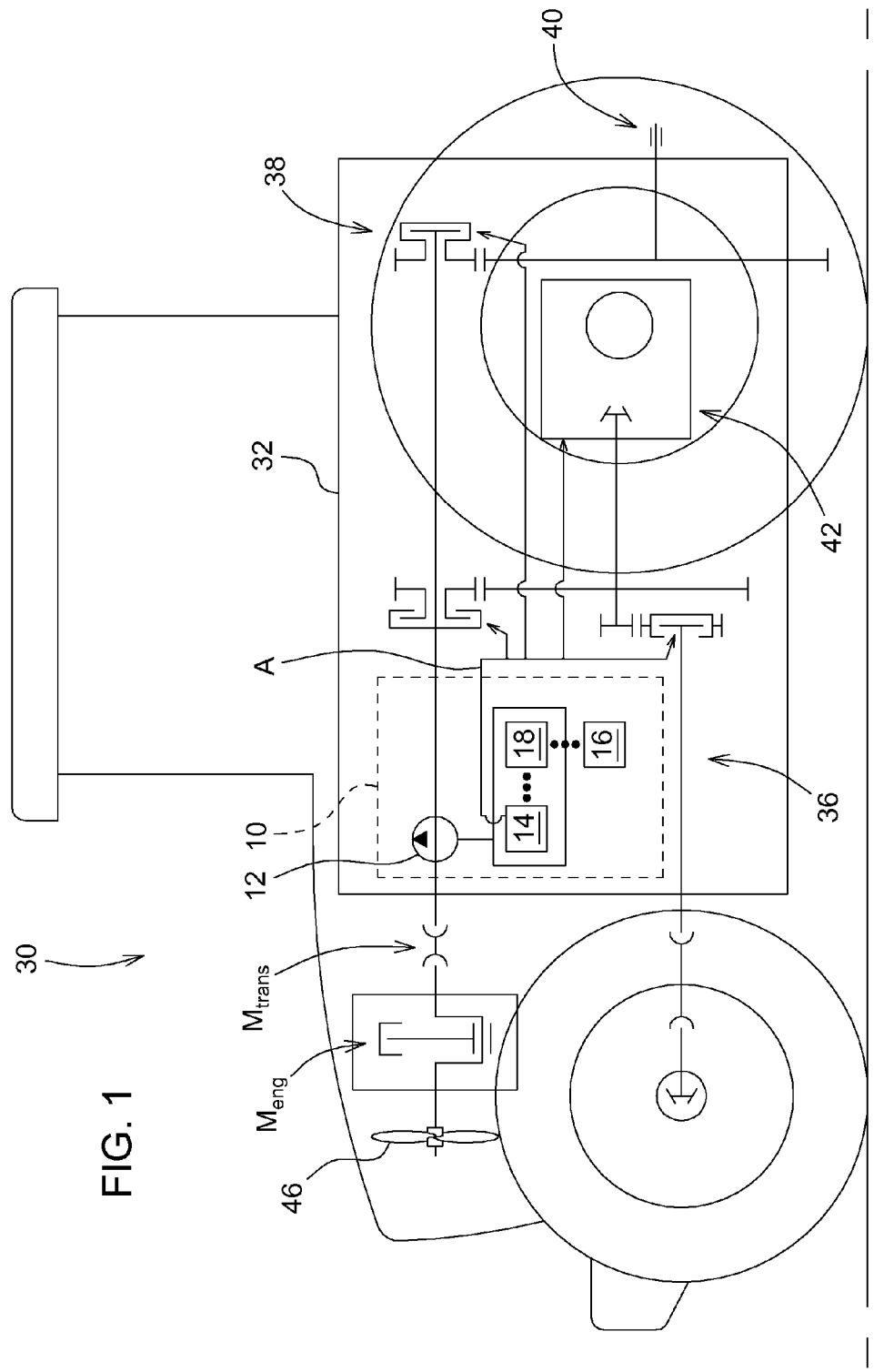
FIG. 1 is a schematic representation of an agricultural working machine with a transmission control circuit.

FIG. 1 shows in a schematic representation an agricultural working machine 30 in the form of a tractor with a transmission control circuit 10 according to the present disclosure for a transmission 32. The transmission 32 can be a power shift transmission or a power split transmission. The transmission 32 contains an output 36 for a front wheel drive that can be selected as required and a plurality of power shift clutches 34, of which one is illustrated by way of example, in order to engage or disengage various transmission ratios of the transmission. The transmission 32 also contains a power take-off clutch 38 for driving a power take-off 40 and a differential transmission 42 with a differential lock. An internal combustion engine is provided as the drive unit 44 for the tractor 30. Optionally, a front power take-off that is not shown can be provided. The internal combustion engine 44 produces a drive torque $M_{eng}$. Auxiliary units such as at least one coolant fan 46 are driven by means of said internal combustion engine. Here the coolant fan is an example for other auxiliary units, which are referred to as parasitic loads within the context of the description of this disclosure. The drive torque $M_{eng}$ arrives at the input of the transmission 32 as the transmission input torque $M_{trans}$ after subtracting the parasitic loads for the drive of the auxiliary units.

A plurality of essentially identical valve units, which are also not shown, are provided for operating the power shift clutches 34. The valve units are supplied with a system pressure for operating the power shift clutches 34 by means of the hydraulic circuit, A, in FIGS. 1 and 2. The transmission control circuit 10 is used to set a system pressure for the hydraulic circuit A.

Figure 2:
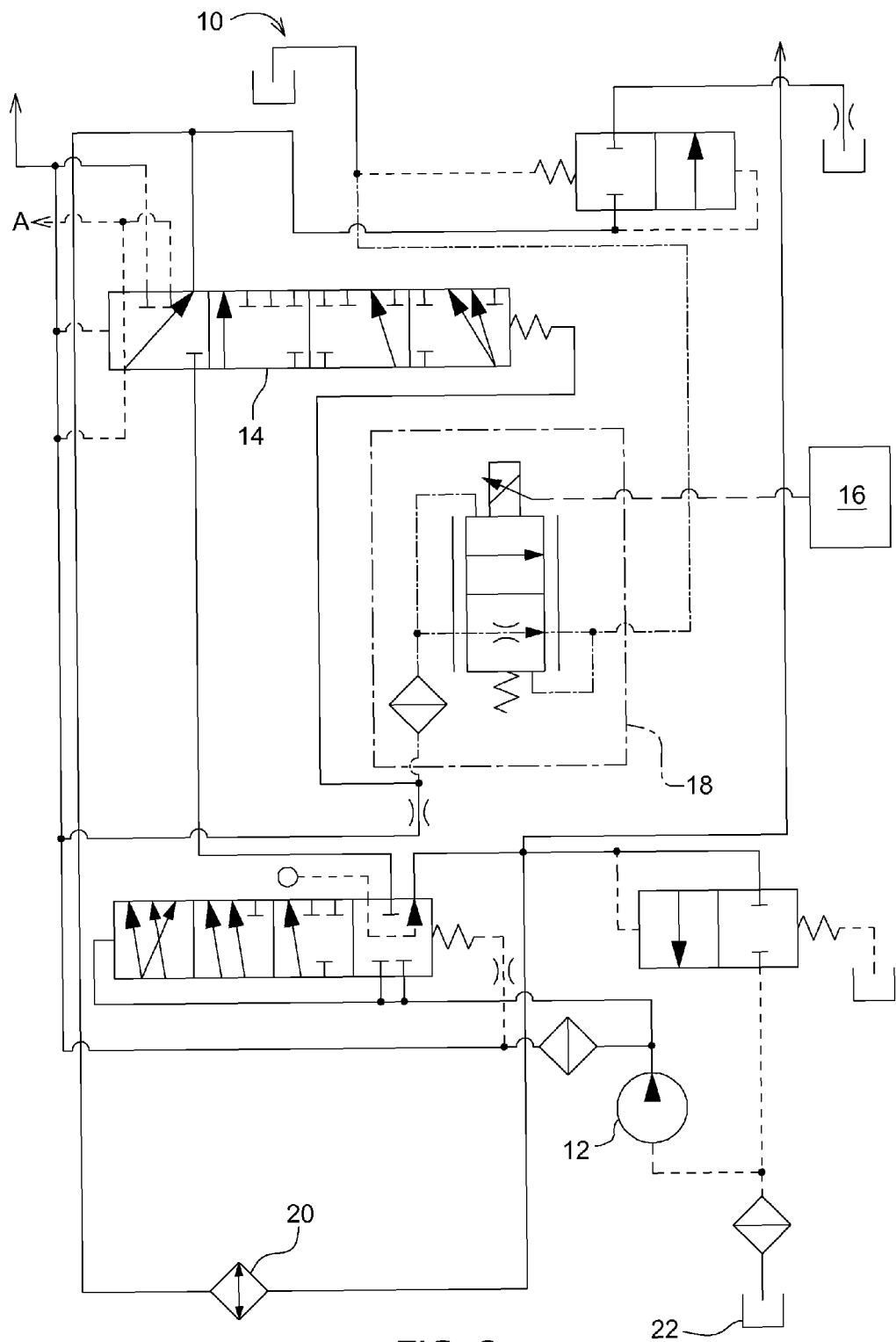
FIG. 2 is a schematic diagram of the transmission control circuit.

The transmission control circuit 10 includes a pressure pump 12 in the form of a transmission oil pump, a pressure control valve 14, a control unit 16, a pressure limiting valve 18, an oil cooler 20, an oil reservoir 22 and an oil filter 24, as shown in FIG. 2. As is known to one skilled in the art, other components such as various relief valves, bypass valves, chokes and filters may be provided.

The system pressure provided by the oil pump 12 is first set by the pressure control valve 14 to a maximum system pressure $p_0$ in the hydraulic circuit A. In this case the pressure limiting valve 18, which is implemented as a solenoid valve, is not energized or is not activated by the control unit 16. Depending on the already described load and operating states, which are detected by the control unit 16, activation of the pressure limiting valve 18 can be carried out by the control unit 16, whereby the pressure limiting valve 18 overrules the pressure control valve 14. The overruling takes place by the pressure limiting valve 18 varying the supporting force acting on the piston-spring unit of the pressure control valve 14. In this way the force equilibrium between the current system pressure acting on the piston and the spring force acting on the piston can be set. The force equilibrium corresponds to the relief point from which the system pressure is released in the coolant circuit.

Figure 3:
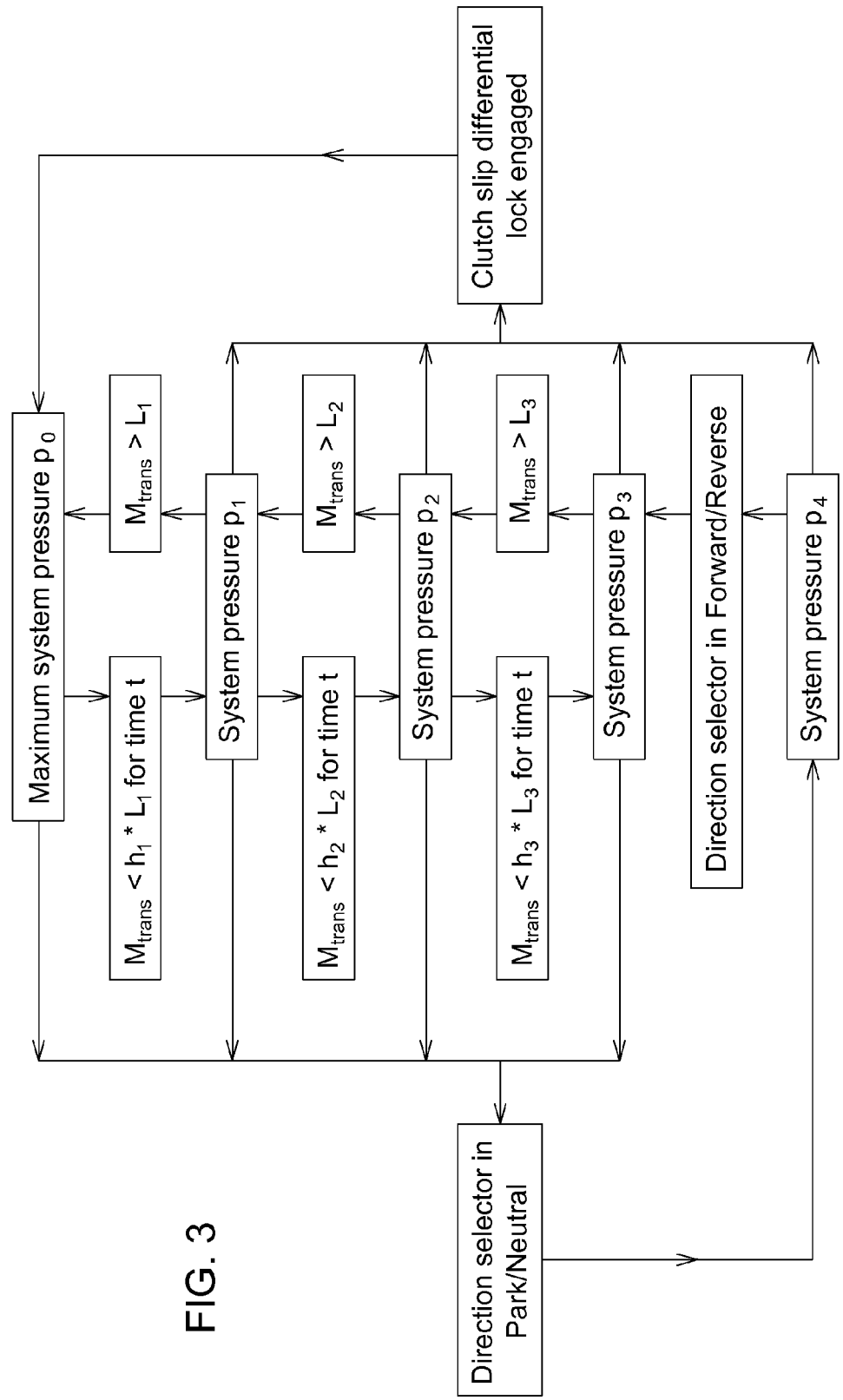
FIG. 3 is a representation of levels of the reduced system pressures below the maximum system pressure.

In FIG. 3, a total of five discrete levels of the system pressures are shown, wherein the top level is formed by the maximum system pressure $p_0$, and the bottom level is formed by a minimum system pressure $p_4$. The maximum system pressure $p_0$ corresponds to the pressure with the pressure limiting valve 18 not activated, i.e., if the same is not controlling the pressure control valve 14. The minimum system pressure $p_4$ corresponds to the pressure that occurs at maximum overrule of the pressure control valve 14 by the pressure limiting valve 18 as a result of the lubrication back pressure and the cooler back pressure.

In FIG. 3, downward pointing arrows to lower system pressures are shown on the left side and upward pointing arrows to higher system pressures are shown on the right side. If the control unit 16 detects that from any currently existing system pressure $p_0$, $p_1$, $p_2$, $p_3$, $p_4$ a transmission shift selector is changed into the "Park" or "Neutral" positions, the minimum system pressure $p_4$ is set. If the control unit 16 detects that the transmission input torque $M_{trans}$ is less than one of the transmission input torque limits $L_1$, $L_2$, $L_3$ multiplied by a hysteresis factor $h_1$, $h_2$, $h_3$ for a defined period of time t, the reduced system pressure $p_1$, $p_2$, $p_3$ corresponding to the respective transmission input torque limit $L_1$, $L_2$, $L_3$ is set. If the control unit 16 detects that from the minimum system pressure $p_4$ the shift selector is changed to the positions "forward" or "reverse", the next higher reduced system pressure $p_4$ is set. If the control unit 16, starting from any reduced system pressure $p_1$, $p_2$, $p_3$, $p_4$, detects that slip is occurring in one of the selected power shift clutches in the transmission or the differential lock is engaged, the maximum system pressure $p_0$ is set. Any setting of a system pressure below the maximum system pressure $p_0$ is carried out by corresponding activation of the pressure limiting valve 18 by the control unit 16.

In principle, it can be provided that a reduced system pressure $p_1$, $p_2$, $p_3$, $p_4$ below the maximum system pressure $p_0$ is only set if a revolution rate sensor of the internal combustion engine 44 senses a revolution rate above a revolution rate limit such as, for example, 50 revolutions per minute (rpm), and if at the same time a temperature sensor of the transmission 32 senses an oil temperature above a temperature limit such as, for example, 40° C. The latter criterion ensures rapid heating of the transmission oil.

Furthermore, continuous pressure monitoring is provided by means of which the system pressure selected by the control unit 16, i.e., the target system pressure, is compared with the actually existing system pressure, i.e. the actual system pressure.

Figure 4:
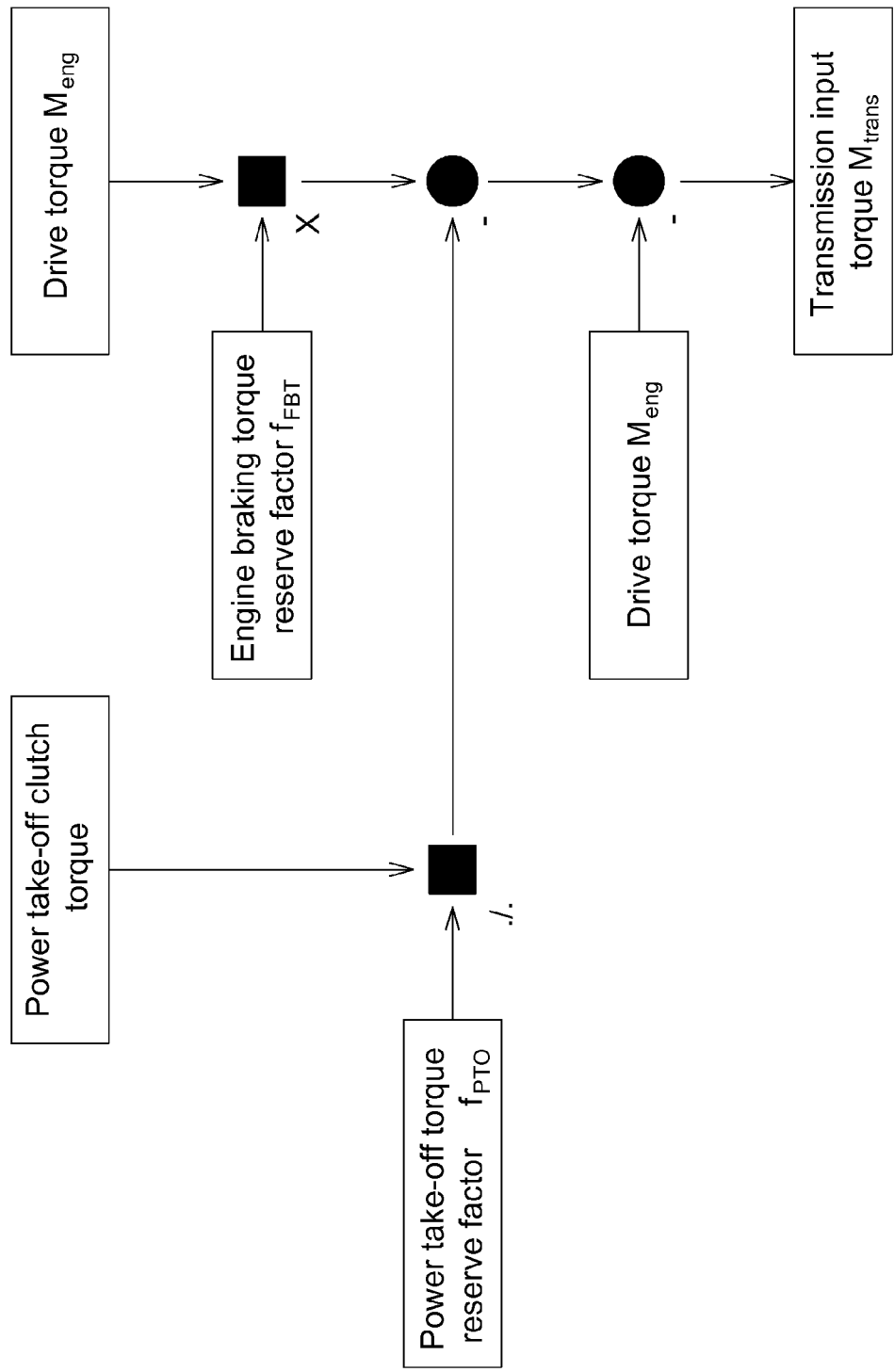
FIG. 4 is a flow chart for determining the transmission input torque.

In FIG. 4, the process or the procedure for the calculation of the transmission input torque $M_{trans}$ is shown. The transmission input torque $M_{trans}$ is calculated based on the drive torque $M_{eng}$ of the drive unit 44 of the working machine 30. The drive torque $M_{eng}$ corresponds to the torque at the crankshaft output of the drive unit in the case of an internal combustion engine or at the rotor output in the case of an electrical machine. It can be seen that the power take-off clutch torque and parasitic loads such as, for example, drive torques for the auxiliary units, are subtracted from the drive torque $M_{eng}$. In principle, the accuracy of the calculation of the transmission input torque $M_{trans}$ can be increased by carrying out very accurate determination and calculation of the parasitic loads. The drive torque $M_{eng}$ is first multiplied by a reserve factor $f_{EBT}$ for the engine braking torque. Both the power take-off clutch torque divided by a reserve factor $f_{PTO}$ for the power take-off torque and the parasitic loads are subtracted from this to obtain the transmission input torque $M_{trans}$.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission control circuit for controlling a system pressure provided by a pressure pump in a transmission of a working machine, comprising:
    a pressure control valve for setting the provided system pressure to a maximum system pressure,
    an electronic control unit configured to detect load states and operating states of the working machine, the electronic control unit storing transmission input torque limits associated with the load states and state values representing at least one first operating state and at least one second operating state, wherein the first operating state corresponds with the maximum system pressure and the second operating state corresponds with a reduced system pressure compared to the maximum system pressure, and
    a pressure limiting valve being operably activated by the control unit to overrule the pressure control valve in order to variably set the reduced system pressure,
    wherein, while in the second operating state, an activation of the pressure limiting valve is based on a comparison between a detected load state and a transmission input torque limit.

2. The transmission control circuit of claim 1, wherein:
    the control unit detects the load state using a determined transmission input torque; and
    electronic activation of the pressure limiting valve is based on a comparison between the determined transmission input torque and the transmission torque limit.

3. The transmission control circuit of claim 1, wherein the electronic activation of the pressure limiting valve for setting the reduced system pressure is executed if the determined transmission input torque is below a transmission input torque limit.

4. The transmission control circuit of claim 1, wherein the electronic activation of the pressure limiting valve for increasing the reduced system pressure is executed if the determined transmission input torque lies above the transmission input torque limit.

5. The transmission control circuit of claim 1, wherein the transmission input torque is determined based on a drive torque of a drive unit of the working machine.

6. The transmission control circuit of claim 5, wherein the transmission input torque is determined based on a parasitic load from the drive torque.

7. The transmission control circuit of claim 1, wherein the pressure limiting valve sets the reduced system pressure by manipulating a spring force of a spring-piston unit of the pressure control valve.

8. The transmission control circuit of claim 7, wherein a relief point of the system pressure in a coolant circuit can be adjusted by manipulation of the spring force of the spring-piston unit of the pressure control valve.

9. The transmission control circuit of claim 1, wherein the first operating state comprises a differential lock of the working machine being in an engaged state or a state of increased slip within the transmission.

10. The transmission control circuit of claim 1, wherein the second operating state comprises an unloaded state or a differential lock or power take-off of the working machine being in a disengaged state.

11. The transmission control circuit of claim 1, wherein an activation of the pressure limiting valve by the control unit remains unchanged during a transmission shift process.

12. The transmission control circuit of claim 1, wherein, when a first activation signal and a second activation signal are concurrently triggered by the control unit for the pressure limiting valve, the signal corresponding to a higher system pressure is prioritized.

13. The transmission control circuit of claim 1, wherein the maximum system pressure is set if a fault in the transmission control circuit is detected by the control unit.

14. The transmission control circuit of claim 1, wherein an increase of the reduced system pressure is implemented without time delay if a control condition exists, where the corresponding transmission input torque limit is multiplied by a hysteresis factor $h_x < 1$ if the control condition exists for setting the reduced system pressure.

15. The transmission control circuit of claim 14, wherein the corresponding transmission input torque limit is set with a time delay if the control condition exists for setting the reduced system pressure.

16. A working machine with a drive unit and a transmission with a pressure pump for providing a system pressure, comprising a transmission control circuit of claim 1.

* * * * *